(12) United States Patent
Richards et al.

(10) Patent No.: US 7,552,152 B2
(45) Date of Patent: Jun. 23, 2009

(54) RISK-MODULATED PROACTIVE DATA MIGRATION FOR MAXIMIZING UTILITY IN STORAGE SYSTEMS

(75) Inventors: Elizabeth S. Richards, Columbia, MD (US); Sandeep M. Uttamchandani, San Jose, CA (US); Li Yin, Redmond, WA (US)

(73) Assignees: International Business Machines Corporation, Armonk, NY (US); The United States of America as represented by the National Security Agency, Washington, DC (US)

( * ) Notice: Subject to any disclaimer, the term of this patent is extended or adjusted under 35 U.S.C. 154(b) by 279 days.

(21) Appl. No.: 11/681,971

(22) Filed: Mar. 5, 2007

(65) Prior Publication Data
US 2008/0222218 A1 Sep. 11, 2008

(51) Int. Cl.
*G06F 12/00* (2006.01)
(52) U.S. Cl. .................. 707/204; 707/200; 707/202; 707/203; 707/205; 711/162
(58) Field of Classification Search .................. 707/200, 707/201, 202, 203, 204, 205; 711/112, 114, 711/115, 162, 168; 718/104; 709/217, 223
See application file for complete search history.

(56) References Cited

U.S. PATENT DOCUMENTS

| | | | | |
|---|---|---|---|---|
| 5,367,698 | A * | 11/1994 | Webber et al. ............. | 709/203 |
| 6,374,327 | B2 * | 4/2002 | Sakaki et al. ............... | 711/112 |
| 6,571,258 | B1 * | 5/2003 | Borowsky et al. ........... | 707/204 |
| 7,028,079 | B2 | 4/2006 | Mastrianni et al. | |
| 2001/0001870 | A1 | 5/2001 | Ofek et al. | |
| 2001/0011324 | A1 * | 8/2001 | Sakaki et al. ............... | 711/112 |
| 2002/0161778 | A1 * | 10/2002 | Linstedt ..................... | 707/102 |
| 2002/0174419 | A1 * | 11/2002 | Alvarez et al. .............. | 717/168 |
| 2003/0028555 | A1 | 2/2003 | Young et al. | |
| 2006/0053251 | A1 | 3/2006 | Nicholson et al. | |
| 2006/0064555 | A1 | 3/2006 | Prahlad et al. | |
| 2006/0129771 | A1 | 6/2006 | Dasgupta et al. | |

OTHER PUBLICATIONS

Dejan S. Milojicic et al., "Process Migration", ACM, 2001, pp. 241-299.*

(Continued)

*Primary Examiner*—Thuy N Pardo
(74) *Attorney, Agent, or Firm*—Gibb I.P. Law Firm, LLC

(57) ABSTRACT

The embodiments of the invention provide a method, computer program product, etc. for risk-modulated proactive data migration for maximizing utility. More specifically, a method of planning data migration for maximizing utility of a storage infrastructure that is running and actively serving at least one application includes selecting a plurality of potential data items for migration and selecting a plurality of potential migration destinations to which the potential data items can be moved. Moreover, the method selects a plurality of potential migration speeds at which the potential data items can be moved and selects a plurality of potential migration times at which the potential data items can be moved to the potential data migration destinations. The selecting of the plurality of potential migration speeds selects a migration speed below a threshold speed, wherein the threshold speed defines a maximum system utility loss permitted.

1 Claim, 6 Drawing Sheets

OTHER PUBLICATIONS

Yin Xing et al., "Providing Resiliency to Load Variations in Distributed Stream Processing", ACM, 2006, pp. 775-786.*

Lu, et al., "Aqueduct: online data migration with performance guarantees," Conference on File and Storage Technologies (FAST'02), Jan. 28-30, 2002, pp. 219-230.

Shu, et al., "Policy of File Migration at Server in Cluster File System," IEEE International Symposium on Cluster Computing and the Grid, 2004, pp. 691-698.

Nelson, et al., "Modeling and Analysis of Task Migration in Shared-Memory Multiprocessor Computer Systems," Proceedings of the Fourth International Workshop on Modeling, Analysis, and Simulation of Computer and Telecommunication Systems, Feb. 1-3, 1996, pp. 262-266.

* cited by examiner $$\text{Max} \quad \sum_{n=1,N} \sum_{m=1,M} g_{n,m} UF_n(\text{Perf}_{n,m})$$

$$\text{Subject to} \quad \sum_{m=1}^{M} g_{i,m} = 1 \text{ for all } i, i = 1 \text{ to n}$$

FIG. 3

RISK-MODULATED PROACTIVE DATA MIGRATION FOR MAXIMIZING UTILITY IN STORAGE SYSTEMS

This invention was made with Government support under Contact No. H98230-05-3-0001 awarded by Intelligence Agencies. The Government has certain rights in this invention.

BACKGROUND

1. Field of the Invention

The embodiments of the invention provide a method, computer program product, etc. for risk-modulated proactive data migration for maximizing utility.

2. Description of the Related Art

Growing consolidation of storage systems necessitates resource sharing among multiple competing applications with different access characteristics and Service Level Objectives (SLOs). The goal of storage management is to allocate the resources to each application such that the number of SLOs satisfied is maximized. The decision-making for resource allocation is not a one time task, but rather an ongoing process due to the existence of workload variations, application changes, system exceptions (failures and load surges), the resource to application mapping is not a static one-time task and administrators often trigger corrective actions to adjust resource allocation dynamically.

Migration is one of the commonly used corrective actions—it changes the resources allocated to a specific application. Existing commercial tools help in the decision-making for what dataset to migrate and where to migrate. Also, there is ongoing research on deciding the migration speed using feedback loop.

However, migrating data in large scale storage systems that are always full with a continuously high load has additional challenges not addressed by existing research. First, the decision for when to start migration must be made. It has been commonly assumed that migration is triggered by the administrators, typically when the system is lightly loaded (for example, at night) or reactively when problem happened (mostly as background task). The decision for when to start migration is nontrivial since it needs to take account the workload trends, current impact on the utility of applications, etc. Additionally, migration needs to be planned in advance since moving terabytes of data can take days or weeks. In summary, automatically deciding when to start migration action must be considered.

Furthermore, existing research makes migration decisions based on the "current" system state—there is a lack of consideration for the long-term temporal behavior leading to sub-optimal solutions and wastage of system resources (in moving unnecessary data around) or failure to prevent resource contention problems proactively (resulting in more SLO violations than desired).

Additionally, there is always a certain amount of risk involved in moving data—the models for workload growth may have a high volatility or a transient overload may be misunderstood as a permanent load pattern. Most migration tools simply aim to maximize the storage utility—in reality it is required to maximize utility with minimal risks.

SUMMARY

A framework is provided that answers all four questions related to migration: what, where, how and when. The decisions are modulated by the risk involved in terms of the accuracy of the growth predictions, and the resource overhead to reverse a decision. Embodiments herein use a combination of optimization and planning schemes—the optimization phase decides the "what" and "when" by formulating these as a constraint optimization problem with the objective to maximize the overall system utility for a given provisioning window. The output of the optimization is not just a single solution but rather the top-K options. For each of these options, the planning phase decides the when and how—it may be possible that there may not be a feasible when-how combination for all the top-K options. Finally, the migration plans (what, where, when, how) are analyzed for the level of risk involved.

The embodiments of the invention provide a method, computer program product, etc. for risk-modulated proactive data migration for maximizing utility. More specifically, a method of planning data migration for maximizing utility of a storage infrastructure that is running and actively serving at least one application includes selecting a plurality of potential data items for migration and selecting a plurality of potential migration destinations to which the potential data items can be moved. Moreover, the method selects a plurality of potential migration speeds at which the potential data items can be moved and selects a plurality of potential migration times at which the potential data items can be moved to the potential data migration destinations. The selecting of the plurality of potential migration speeds selects a migration speed below a threshold speed, wherein the threshold speed defines a maximum system utility loss permitted.

Furthermore, the selecting of the plurality of the potential data items for migration, the selecting of the plurality of potential migration destinations, the selecting of the plurality of potential migration speeds, and/or the selecting of the plurality of potential migration times includes predicting future workload request rates and/or future system performance. Such predictions are based on historic workload demands, current workload demands, simulation models, device-specific information, and/or expert input. Additionally, the selecting of the plurality of the potential data items for migration, the selecting of the plurality of potential migration destinations, the selecting of the plurality of potential migration speeds, and/or the selecting of the plurality of potential migration times includes balancing an effect on the potential system utility gain of foreground task migration and an effect on the potential system utility gain of background task migration. The foreground task migration and/or the background task migration is selected based on the balancing.

Following this, the method calculates potential system utility gain associated with different migration combinations of the potential data items, the potential migration destinations, the potential migration speeds, and the potential migration times. Next, a risk of system utility loss associated with each of the migration combinations is evaluated. This could involve calculating a probability of system utility loss as a result of incorrectly predicting the future workload request rates and/or the future system performance. A probability of system utility loss as a result of selecting a migration combination that results in system utility loss could also be calculated. Subsequently, a migration combination is selected from the migration combinations that have a highest net system utility gain based on the potential system utility gain and the risk of system utility loss.

Accordingly, the embodiments of the invention provide a method and system for large scale data migration in systems that "never sleep" with the ability to optimize for current as well as look-ahead states. The methods and systems herein decide on invocation time with minimal impact on system performance and prioritize the migration process as foreground or background tasks based on utility impact. Furthermore, risk evaluations of different migration plans are performed, as well as performance modeling and time-series workload forecasts.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 3 is a table illustrating formulation of finding data new placement;

DETAILED DESCRIPTION OF PREFERRED EMBODIMENTS

Figure 1:
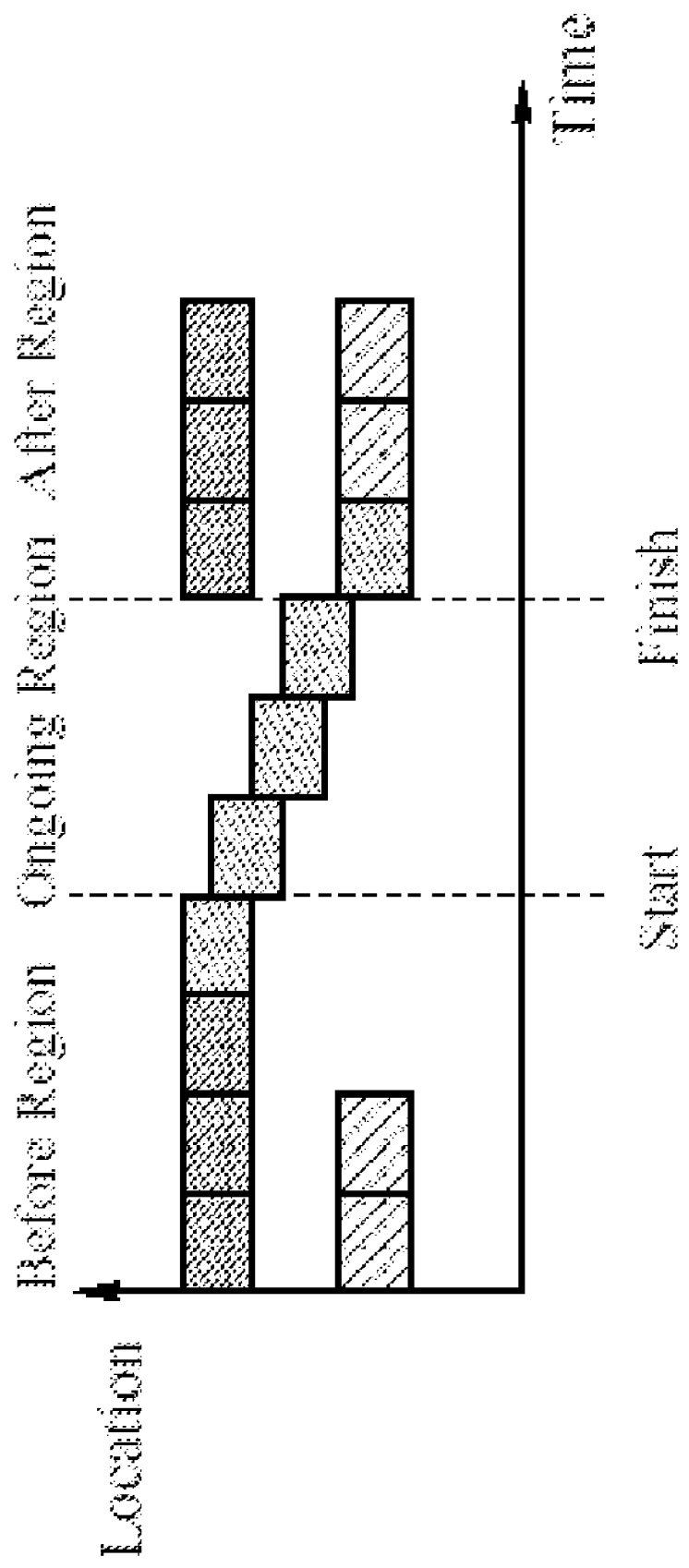
FIG. 1 is a diagram illustrating migration regions.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

The embodiments of the invention provide a method and system for large scale data migration in systems that "never sleep" with the ability to optimize for current as well as look-ahead states. The methods and systems herein decide on invocation time with minimal impact on system performance and prioritize the migration process as foreground or background tasks based on utility impact. Furthermore, risk evaluations of different migration plans are performed, as well as performance modeling and time-series workload forecasts.

Migration can be triggered in two modes: reactively triggered or proactively triggered. Reactive triggering happens after SLOs are violated and proactive triggering is before system runs into bad-state and can be done through periodic examination. After a migration tool box is triggered, it takes input from a future prediction engine, a performance prediction engine, a utility evaluation engine and makes migration decisions in two phases: optimization phase and planning phase. The optimization phase decides what and where to migrate with the goal of optimizing system utility gain (or, in another word, minimize system utility loss) for the given provisioning window. The optimization phase will return multiple migration candidates pairs (what, where) and send them to the planning phase. The planning phase gives a detailed plan including migration speed and starting time for each migration candidate. Finally, the risk analysis engine performs risk assessment on all migration candidates and returns the one leading to best trade-offs of risk and utility gain.

The methods and systems herein comprise an optimization phase, a planning phase, and a risk modulation phase. The optimization phase finds the top-K answers for what to migrate and where. The planning phase finding the best when and how options for each of the top-K answers. Finally, the risk modulation phase evaluates the risk associated with different migration plans and selects a migration plan with maximal benefit and minimal risk. Time series prediction, performance models, workload utility functions are utilized as input parameters. More specifically, in regards to the time series prediction, a future prediction engine is responsible for predicting the future workloads demands. It takes historic data as input and outputs predicted workload request rates. There are several existing methods that can be used for time series prediction. The general form of the time-series function is as follows:

$$y_{t+h} = g(X_t, \theta) + \epsilon_{t+h} \quad (1)$$

where: $y_t$ is the variable(s) vector to be forecast; t is the time when the forecast is made; $X_t$ are predictor variables, which usually include the observed and lagged values of $y_t$ till time t; $\theta$ is the vector of parameter of the function g; and, $\epsilon_{t+h}$ is the prediction error.

In general, by applying time-series analysis techniques, the future prediction engine can detect trends, patterns in the historical data and efficiently forecast the future.

The performance prediction engine takes workloads demands as input and forecasts the corresponding system performance. Here, the performance metrics are the commonly interested throughput, thru, and latency Lat.

There has been significant ongoing research in performance prediction models for storage systems. For example, white-box approaches establish equations using device specific information based on experts knowledge. A simulation based approach measures the performance of targeting system settings using a storage system simulator. Black-box approaches require minimum expert input and device specific information and predict performance based on past historical information. Because the performance prediction engine scans a large candidate space in a short time, solutions based on simulation are not desirable because of the time overhead involved in making performance prediction.

The white-box and black-box approaches can both serve the purpose of performance prediction engine. In general, if device specific information as well as expert input is available, the white-box approach is more preferred because it normally can achieve better accuracy in future forecasting. However, in most cases, it is very difficult, if not impossible, to obtain all required information and black-box approaches are used instead. Existing solutions favor table-based approaches; model regression-based approaches can all be used by the performance prediction engine. The model regression-based approach is used herein to bootstraps the system to build models and refine models continuously at run time.

In regards to the utility evaluation engine, the concept of "utility" is introduced to evaluate the user's perception of 'satisfaction'. It can be defined using different criteria depending on the system's needs. The utility evaluation engine herein is configured by the administrators to maintain the utility function for each application (workload). When the utility function is unclear to the administrator, which might be a very common situation, various utility function configurations can be tried. The administrators can compare different migration decisions for different utility functions and choose the one that matches with his or her experience or system needs most.

The granularity of the utility function can vary depending on information available. For example, if only the priority value and the throughput/latency SLO values are known, the utility function can be defined as:

$$UF(thru, Lat) = \begin{cases} Pri * \dfrac{Thru}{SLO_{thru}} & \text{if } Thru < SLO_{thru} \text{ and } Lat < SLO_{lat} \\ Pri & \text{if } Thru < SLO_{thru} \text{ and } Lat < SLO_{lat} \\ 0 & \text{otherwise} \end{cases} \quad (2)$$

If more information is known, for example, if the SLO specifies that the customer will be charged $1000/MB if the latency is less than 10 ms, otherwise, $100/MB. The SLO will be translated into following utility function:

$$UF(Thru, Lat) = \begin{cases} 1000 * Thru & \text{if } Lat < 10 \text{ ms} \\ 100 * Thru & \text{otherwise} \end{cases} \quad (3)$$

After utility functions are defined, the utility evaluation engine will take the application's performance as input and output the system utility value, which is defined as follows:

$$U_{sys} = \sum_{j=1}^{N} U_j \quad (4)$$

$$= \sum_{j=1}^{N} UF(Thru_j, lat_j) \quad (5)$$

where N is the total number of applications in the system; $U_j$ is the utility value of workload j; and, $Thru_j$ and $Lat_j$ are the performance of application (workload) j.

A migration method provided herein utilizes the following set of notations used in the formulation: $DP_{tij}$ is the predicted demand of workload j at time $t_i$; $UF_j$ is the utility function of workload j; $U_{tij}$ is the utility value of workload j at time $t_i$; and, $UL_{tij}$ is the utility loss of workload j at time $t_i$. Additionally, $Len_{ti}$ is the length of interval $t_i$; T is the total number of decision making interval $t_i$; N is the total number of workloads in the system; and, M is the total number of components in the system. In general, the subscript represents time and workload, i.e. subscript $ti_j$ gives information for workload j in time $t_i$.

A goal of the migration toolbox is to find a migration plan that can lead to minimum system utility loss $UL_{sys}$. For demands $D_j$ and achieved performance ($Thru_j$, $Lat_j$), the system utility loss is calculated as follows:

$$\begin{aligned} UL_{sys} &= U_{max} - U_{sys} \quad (6) \\ &= \sum UL_j \\ &= \sum U_{max_j} - \sum U_j \\ &= \sum UF_j(D_j, SLO_{j_{lat}}) - \sum UF_j(Thru_j, Lat_j) \end{aligned}$$

Figure 2:
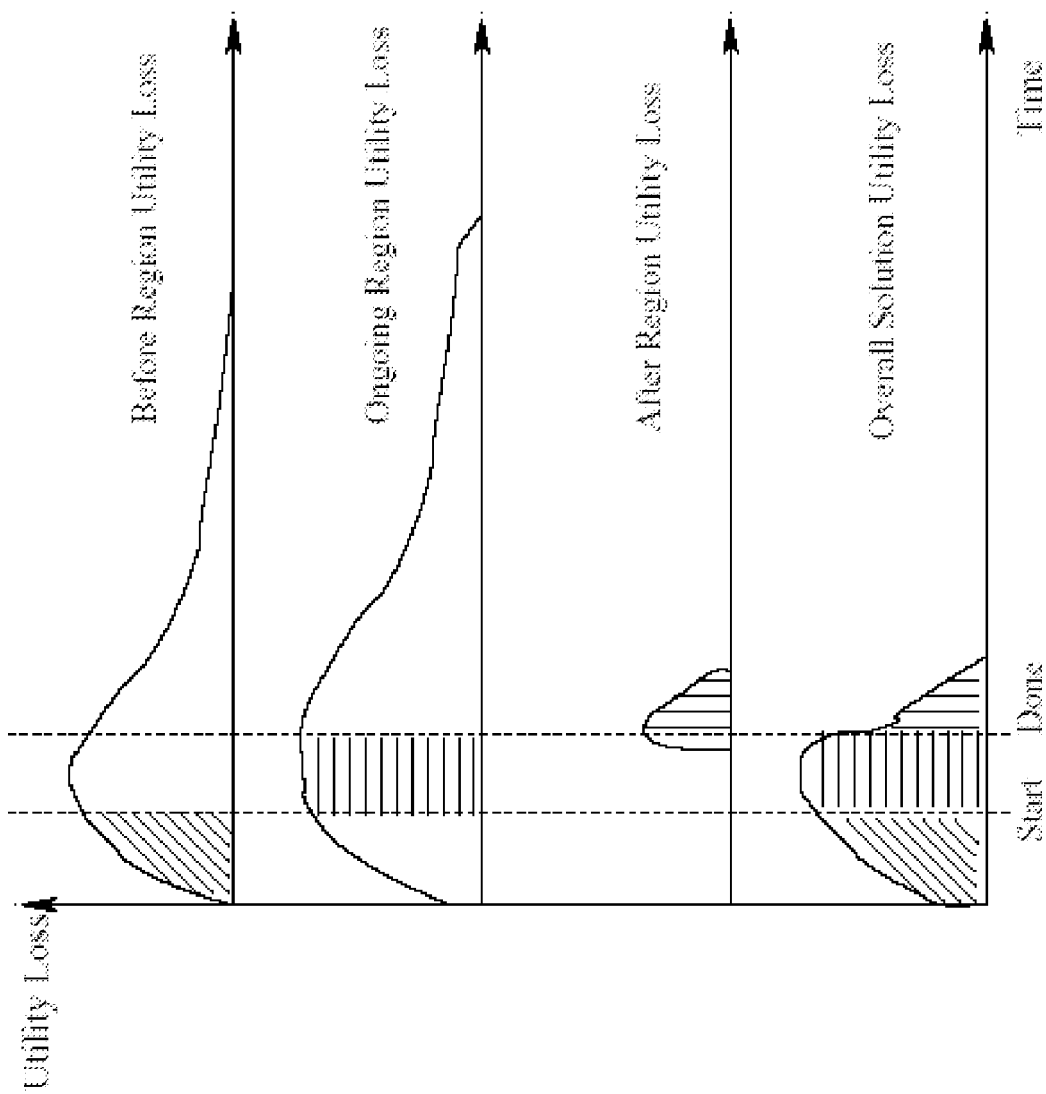
FIG. 2 is a diagram illustrating overall solution utility loss.

In addition, if the system is viewed along the time-line, the migration operation partitions time into three regions: Before migration happens; migration process is Ongoing, and After migration finishes. This is illustrated in FIG. 1, wherein location versus time is graphed. The Before region, the Ongoing region, and the After region are shown along the "Time" axis. A goal of the migration toolbox is to make decisions to minimize the overall system utility loss (the sum over the three regions). FIG. 2 gives the intuition on the calculation of overall system utility loss. Specifically, utility loss is plotted versus time for the Before region, the Ongoing region, the After region, as well as the overall system utility loss.

As illustrated in FIG. 2, for migration operation starts from $t_i$ with an migration lead time $m_{ti}$, the overall solution utility loss is calculated as follows:

$$\begin{aligned} UL_{M_n} &= UL_{Before} + UL_{Ongoing} + UL_{After} \quad (7) \\ &= \sum_{l=1}^{i-1} UL_{tl_{sys}} + UL_{Ongoing} + UL_{After} \\ &= \sum_{l=1}^{i-1} UL_{tl_{sys}} + \sum_{l=i}^{i+m_{ti}-1} UL'_{tl_{sys}} + UL_{After} \\ &= \sum_{l=1}^{i-1} UL_{tl_{sys}} + \sum_{l=i}^{i+m_{ti}-1} UL'_{tl_{sys}} + \sum_{i+m_{ti}}^{T} UL''_{tl_{sys}} \end{aligned}$$

where UL, UL' and UL" are utility loss for the Before, Ongoing, and After regions, respectively. The behavior in the Before region is not affected by the migration decision and only depends on old system settings and workload demands. Therefore, UL can be calculated using Equation 6, above, with old data placement settings. The performance of the After region is determined by the what and where decisions and UL" can be calculated similarly as UL with new data placement plugged in. The Ongoing region is when data are moved around and is affected by the how migration speed. The boundaries between regions are determined by when, how and what. Specifically, the when answer decides the starting point of the Ongoing region and the how and what determines the length of the Ongoing region and thereby the starting point of the After region. In summary, the answers to each question will affect the final $UL_{sys}$.

Finding migration solution is a non-polynomial (NP) complete problem because even the what and where can be reduced to the set number problems. In order to reduce the complexity, the decision making procedure is broken down into two phases: the optimization phase and the planning phase. The optimization phase deals with the After region: it solves what and where. The planning phase deals with the Ongoing region and the region boundaries: it solves when and how. At each phase, the selection criteria are still based on the final goal of minimizing system utility loss. The trade-off of solving the problem sequentially is the optimality of the final answer cannot be guaranteed.

The optimization phase decides the what and where. The After region reflects migration operation's "permanent" effect: system setting is altered "permanently" by migration the "what" datasets to "where". The state of the After region represents resource reallocation results and the system settings that the system is optimized toward. The goal of the optimization phase is to find an "optimal" data placement plan such that the system utility loss can be minimized. It is a constraint optimization problem formulated in FIG. 3, where $UF_n$ is the utility function of workload n and $Perf_{nm}$ is the predicted performance of workload n on component m; $s_{nm}$ is the optimization variable and $s_{nm}=1$ if workload n is placed on component m and $s_{nm}=0$ otherwise.

Figure 4:
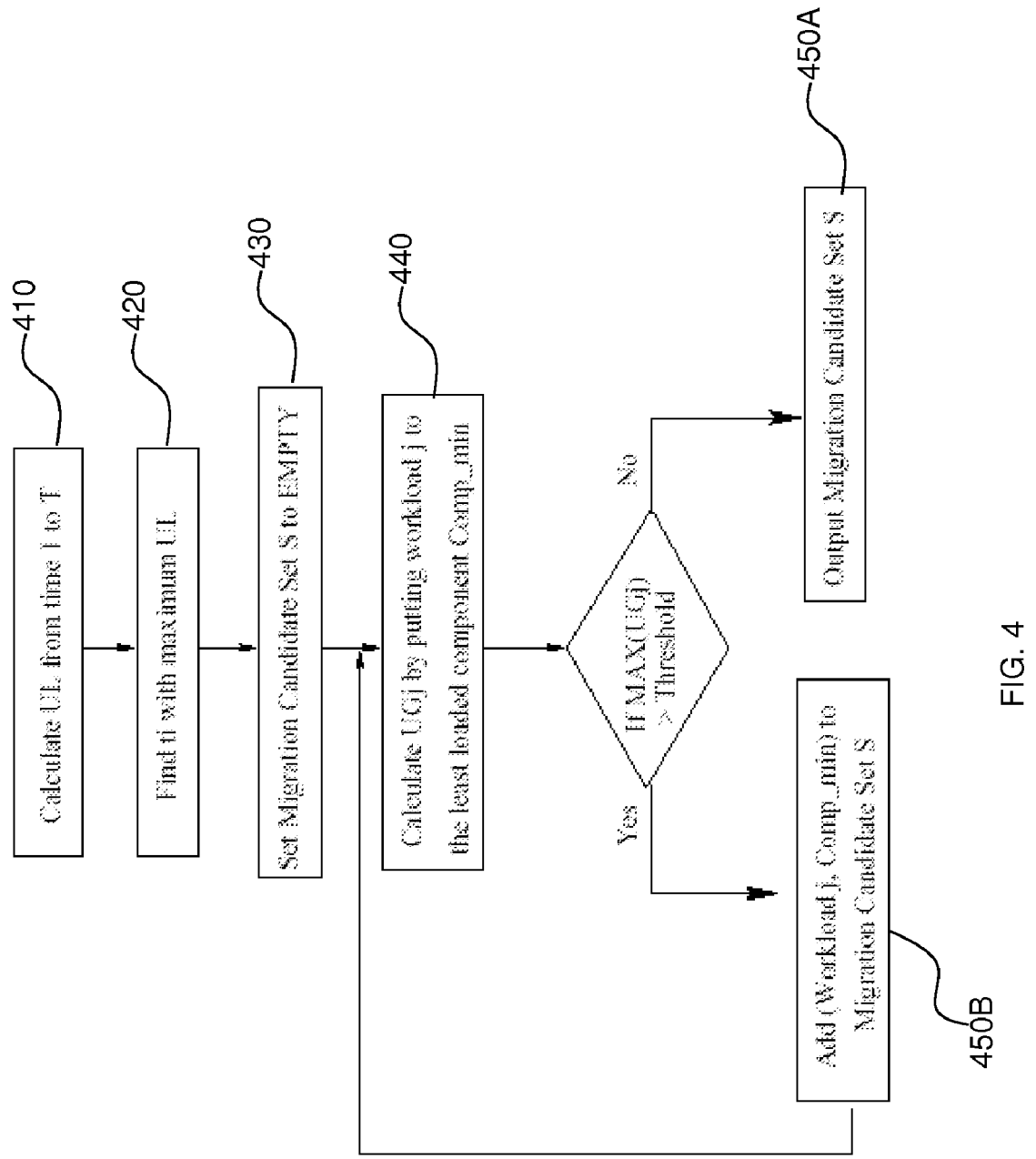
FIG. 4 is a flow diagram illustrating an optimization phase.
Figure 5:
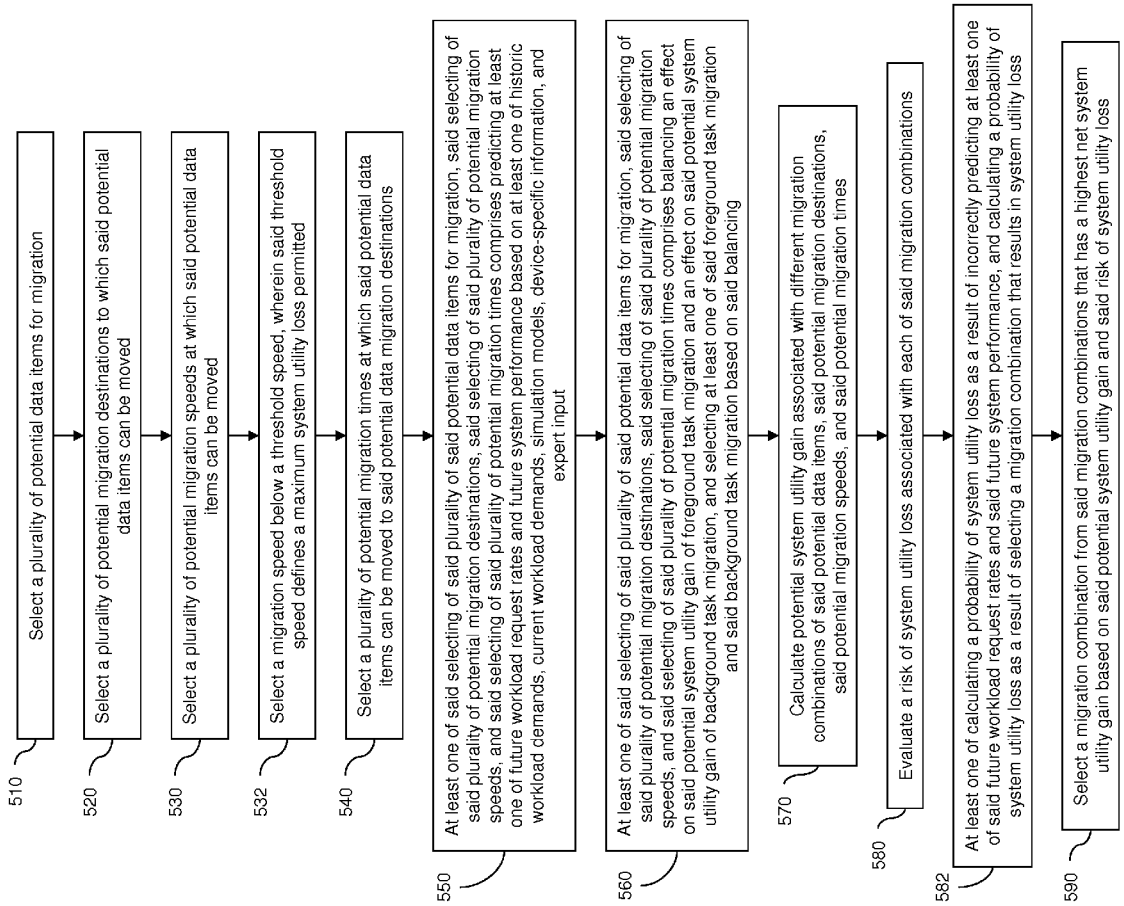
FIG. 5 is a flow diagram illustrating a method for risk-modulated proactive data migration for maximizing utility in storage systems.

The constraint represents the limitation that one workload can only be placed in one component. The optimization problem is very complicated because the utility function can be of any format. Further, $Perf_{nm}$ can be of any format and is related to other workloads running on component m. Because of the complexity, the classic optimization approximation technique is used, i.e., a greedy method to find the approximated optimal solution. The method is summarized in a flow diagram shown in FIG. 4.

Specifically, UL from time 1 to T is calculated (item 410) and $t_i$ with maximum UL is found (item 420). The migration candidate Set S is set to EMPTY (item 430). Next, $UG_j$ is calculated by putting workload j to the least loaded component Comp_min (item 440). If $MAX(UG_j)$ is below a threshold, then the migration candidate Set S is output (item 450A). If $MAX(UG_j)$ is above the threshold, then (workload j, Comp_min) is added to the migration candidate Set S (item 450B) and the process repeats items 440.

In the flow diagram, the UL for time $t_i$ is calculated using the Equation 6, above, and $UG_j$ is defined as the utility gain of moving workload j to the least loaded component. It can be calculated as follows: first, the predicted performance is calculated using the performance model. Secondly, the $UL''_{sys}$ is calculated using utility functions. Finally, the $UG_j$ is the difference of $UL_{sys}$ (before migration) and the $UL''_{sys}$ (after migration). In addition, the selection of threshold reflects the trade-offs between convergence speed and quality of returned solution.

In order to return multiple migration candidate sets, for each workload j, a value $V_j$ is assigned as 0 initially. Next, for each run of the flow diagram in FIG. 4, for the returned migration candidate set S, the workload j with minimum $UG_j$=$size_j$ ratio is found and its $V_j$ is set as 1. Following this, in the flow diagram, when workload leading to the maximum $UG_j$ is selected, only workloads with $V_j$=0 are considered. The intuition behind this design is to remove workload candidates with low benefit ($UG_j$) and high cost ($size_j$).

The planning phase decides the when and how. As shown in FIG. 2 and Equation 7, the answer to how and when will affect the behavior of the Ongoing region and the boundary partitions. In the planning phase, the goal is to decide the migration speed (how) and when. From Equation 7, it is apparent that the when decision will be depending on the answer to the how decision, therefore, migration speed will be decided first.

In regards to deciding migration speeds, with the assistance of the performance model, the performance impact of the migration process on the whole system can be predicted. Therefore, migration speed optimization can be performed accordingly. With a goal of minimizing system utility loss in mind, the migration speed decision should be evaluated according to the utility impact of the migration process. The migration process will increase system utility loss temporarily because it will compete with application workloads for the already limited resources. However, at the same time, migration will increase the long term system utility gain because the earlier the migration process finishes, the earlier the system utility loss is saved. In order to account for the utility impact of the migration process, a threshold on the maximum utility loss allowed due to increasing migration speed is set, which is shown in Equation 8.

$$UBound_{ti} = \frac{\sum_{wj \in Comp_{mig}} UF_j(DP_{ti_j}, SLO_{j_{lat}})}{C} \quad (8)$$

$Comp_{mig}$ is the component where the migration process is running on and C is a positive number which reflects how aggressive the migration process is allowed to be. The smaller the C is, the more aggressive the migration process is.

Based on the $UBound_{ti}$, the migration speed at each time point $t_i$ is chosen using a greedy method as follows: first, MigSpeed is set to 0. Second, MigSpeed is increased by P I/O, where P is the step-size and is a positive integer. For example, it can be 10 or 100 depending on the desired control granularity. Next, the performance for each workload in the system is estimated using the performance model. The $U'_{ti_j}$ and corresponding $U'_{ti_{sys}}$ is then calculated. Following this, the utility loss due to migration process is: $UL_{ti_{mig}} = U'_{ti_{sys}} - U_{ti_{sys}}$. Finally, if $UL_{ti_{mig}} > UBound_{ti}$, then the process returns to the previous migration speed and stops. Otherwise, the process returns to the second step, above (i.e., MigSpeed is increased by P I/O). The returned MigSpeed is the maximum allowed migration speed for time $t_i$, represented as $MigSpeed_{ti}$.

In regards to choosing the start time $t_i$, the migration decision about "when to move" has been ignored by most migration toolboxes. Most existing migration tools assume the decision is given by the administrator. However, the decision on when is not always straightforward. For example, for the same $t_0$ system state, in some scenario, the migration should be invoked immediately, i.e., if the system load is increasing continuously such that the problem will only get worse. While in some cases, the migration should be invoked later, i.e., if the system will be less loaded after several hours. In addition, sometimes the migration action should be started before the system runs into a 'bad'-state. In general, the decision on when analyzes future demands and future states. In some situation, this information is either not very straight-forward to the administrator or cannot be directly obtained. Therefore, it is desirable that the migration tool box has the ability to choose the migration starting time and release the burden from the administrator.

As shown in FIG. 2, the answer to when should be chosen such that the overall system utility loss is minimized. From Equation 7, the overall system utility loss if the migration is started at time ti is related to UL,UL', UL" and $m_{ti}$. Moreover, UL and UL" can be calculated by plugging in the old and new data placement. UL' can be decided once the migration speed is chosen. The only missing value is $m_{ti}$, which can be calculated as follows:

$$MigSize_{ti} = MigSpeed_{ti} * Len_{ti}$$

$$m_{ti} = Min\left(n \text{ such that} \sum_{j=ti}^{n} MigSize_{tj} \geq TotalMigSize\right)$$

where TotalMigSize is the size of total datasets to be migrated.

The when question can now be answered using following method: first, for each time $t_i$, $MigSpeed_{ti}$, $MigSize_{ti}$, $UL_{ti_{sys}}$, $UL'_{ti_{sys}}$, and $UL''_{ti_{sys}}$ are calculated. Next, for each time $t_i$, the corresponding lead time $m_{ti}$ is calculated if migration is started at time $t_i$. The method then defines $BeforeUL_{ti}$ and $OngoingUL_{ti}$ as the utility loss in the Before and Ongoing regions, respectively, if the migration is started at time $t_i$ and $AfterUL_{ti}$ as the utility loss in the After region if migration ends at $t_i$. They can be calculated as follows:

$$BeforeUL_{ti} = \sum_{l=1}^{i-1} UL_{tl_{sys}} \quad (9)$$

$$OngoingUL_{ti} = \sum_{l=i}^{i+m_{ti}} UL_{tl_{sys}} \quad (10)$$

$$AfterUL_{ti} = \sum_{l=ti+1}^{T} UL''_{tk_{sys}} \quad (11)$$

By defining BeforeUL and AfterUL in such a way, they can be calculated recursively as follows:

$$BeforeUL_{ti+1} = UL_{ti_{sys}} + BeforeUL_{ti} \quad (12)$$

$$AfterUL_{ti-1} = UL''_{ti_{sys}} + AfterUL_{ti} \quad (13)$$

Next, for each time $t_i$, the utility loss of starting migration at time $t_i$ is:

$$UL_{Mti} = BeforeUL_{ti} + OngoingUL_{ti} + AfterUL_{ti+m_n} \quad (15)$$

The $t_i$ leading to minimum $UL_{Mti}$ is subsequently returned as the chosen migration starting time.

Risk captures the probability that the utility improvement of action invocation will be lost (in the future system-states) as a result of volatility in the workload time-series functions. For example, the demand for $W_1$ was expected to be 10K IOPS after 1 month, but it turns out to be 5K (the inverse of this problem is handled reactively). Additionally, the formulation of risk should take into account the loss in utility as a result of making the wrong decision. For example, moving data at 11 am in a weekday morning (during high system utilization) has a higher risk compared to moving the data at 9 pm on a weekend (during low system utilization). The utility lost due to a wrong decision is higher in the former case than the latter. Similarly, the impact of the wrong decision is dependent on the amount of data moved (in the case of migration), or the cost of new hardware (in the case of hardware planning).

There are several techniques for measuring risk—actions for assigning storage resources among workloads are analogous to portfolio management in which funds are allocated to various company stocks. In economics and finance, the Value at risk, or VaR, is a technique used to estimate the probability of portfolio losses based on the statistical analysis of historical price trends and volatilities in trend prediction. In the context of the data migration herein, VaR represents the probability with a 95% confidence that the workload system will not grow in the future, thereby making the action invocation unnecessary.

$$VaR(95\% \text{ confidence}) = -1.65\sigma \times \sqrt{T} \quad (16)$$

where: $\sigma$=standard deviation of the time-series request-rate predictions, and T=the number of days in the future for which the risk estimate holds.

The risk value $RF(A_i)$ of action i is calculated as follows:

$$RF(A_i) = (1+a) \ast VaR \quad (17)$$

where a reflects the risk factors of an individual action (based on its operational semantics), which is defined as follows:

$$a_{thr} = 0$$

$$a_{mig} = \frac{\text{bytes\_moved}}{\text{total\_bytes\_on\_source}} \ast Uti_{sys}$$

$$a_{hw} = \frac{\text{hardware\_cost}}{\text{total\_budget}} \ast (1 - Uti_{sys})$$

Where $Uti_{sys}$ is the system utilization when the action is invoked.

The embodiments of the invention provide a method, computer program product, etc. for risk-modulated proactive data migration for maximizing utility. More specifically, a method of planning data migration for maximizing utility of a storage infrastructure that is running and actively serving at least one application includes selecting a plurality of potential data items for migration and selecting a plurality of potential migration destinations to which the potential data items can be moved. As described above, the optimization phase decides the "what" and "when" by formulating these as a constraint optimization problem with the objective to maximize the overall system utility for a given provisioning window. The output of the optimization is not just a single solution but rather the top-K options.

Moreover, the method selects a plurality of potential migration speeds at which the potential data items can be moved and selects a plurality of potential migration times at which the potential data items can be moved to the potential data migration destinations. The selecting of the plurality of potential migration speeds selects a migration speed below a threshold speed, wherein the threshold speed defines a maximum system utility loss permitted. As described above, with the assistance of the performance model, the performance impact of the migration process on the whole system can be predicted. With a goal of minimizing system utility loss in mind, the migration speed decision should be evaluated according to the utility impact of the migration process. The migration process will increase system utility loss temporarily because it will compete with application workloads for the already limited resources. However, at the same time, migration will increase the long term system utility gain because the earlier the migration process finishes, the earlier the system utility loss is saved.

Furthermore, the selecting of the plurality of the potential data items for migration, the selecting of the plurality of potential migration destinations, the selecting of the plurality of potential migration speeds, and/or the selecting of the plurality of potential migration times includes predicting future workload request rates and/or future system performance. Such predictions are based on historic workload demands, current workload demands, simulation models, device-specific information, and/or expert input. As described above, time series prediction, performance models, workload utility functions are utilized as input parameters. Specifically, in regards to the time series prediction, a future prediction engine is responsible for predicting the future workloads demands. It takes historic data as input and outputs predicted workload request rates.

Additionally, the selecting of the plurality of the potential data items for migration, the selecting of the plurality of potential migration destinations, the selecting of the plurality of potential migration speeds, and/or the selecting of the plurality of potential migration times includes balancing an effect on the potential system utility gain of foreground task migration and an effect on the potential system utility gain of background task migration. The foreground task migration and/or the background task migration is selected based on the balancing. Following this, the method calculates potential system utility gain associated with different migration combinations of the potential data items, the potential migration destinations, the potential migration speeds, and the potential migration times.

Next, a risk of system utility loss associated with each of the migration combinations is evaluated. This could involve calculating a probability of system utility loss as a result of incorrectly predicting the future workload request rates and/or the future system performance. For example, the demand for $W_1$ was expected to be 10K IOPS after 1 month, but it turns out to be 5K (the inverse of this problem is handled reactively). A probability of migration process will increase system utility loss temporarily because it will compete with application workloads for the already limited resources. However, at the same time, migration will increase the long term system utility gain because the earlier the migration process finishes, the earlier the system utility loss is saved. The method also selects a plurality of potential migration times at which the potential data items can be moved to the potential data migration destinations (item 640). It is recognized that items 630 and 640 could be performed simultaneously.

In item 650, the selecting of the plurality of the potential data items for migration, the selecting of the plurality of potential migration destinations, the selecting of the plurality of potential migration speeds, and/or the selecting of the plurality of potential migration times comprises predicting future workload request rates and/or future system performance based on historic workload demands, current workload demands, simulation models, device-specific information, and/or expert input. As described above, time series prediction, performance models, workload utility functions are utilized as input parameters. Specifically, in regards to the time series prediction, a future prediction engine is responsible for predicting the future workloads demands. It takes historic data as input and outputs predicted workload request rates.

Additionally, in item 660, the selecting of the plurality of the potential data items for migration, the selecting of the plurality of potential migration destinations, the selecting of the plurality of potential migration speeds, and/or the selecting of the plurality of potential migration times balances an effect on the potential system utility gain of foreground task migration and an effect on the potential system utility gain of background task system utility loss as a result of selecting a migration combination that results in system utility loss could also be calculated. For example, moving data at 11 am in a weekday morning (during high system utilization) has a higher risk compared to moving the data at 9 pm on a weekend (during low system utilization). Subsequently, a migration combination is selected from the migration combinations that has a highest net system utility gain based on the potential system utility gain and the risk of system utility loss.

Figure 6:
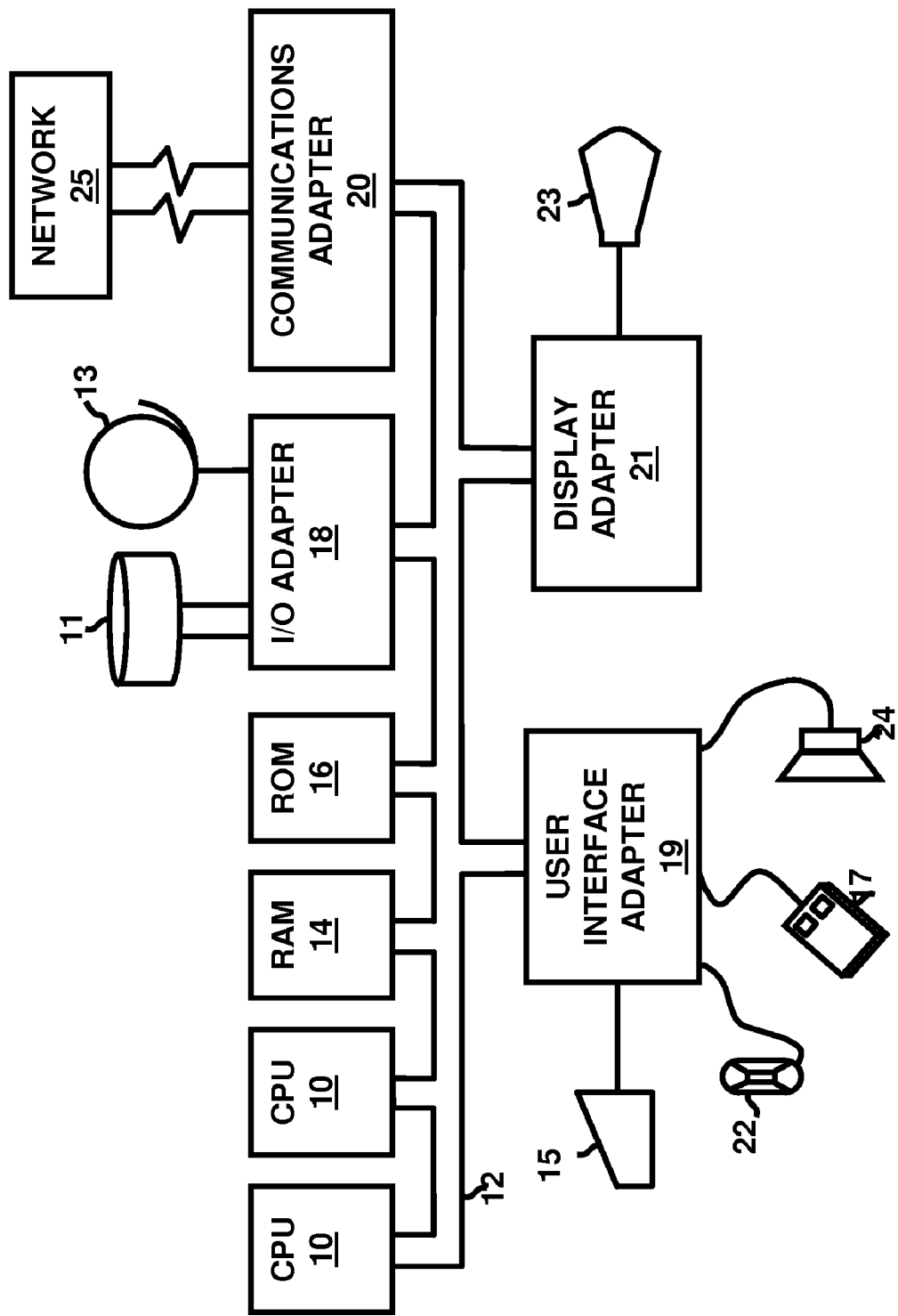
FIG. 6 is a diagram illustrating a computer program product for risk-modulated proactive data migration for maximizing utility in storage systems.

FIG. 6 is a flow diagram illustrating a method for risk-modulated proactive data migration for maximizing utility in storage systems. More specifically, the method selects a plurality of potential data items for migration (item 610) and selects a plurality of potential migration destinations to which the potential data items can be moved (item 620). It is recognized that items 610 and 620 could be performed simultaneously. As described above, the optimization phase decides the "what" and "when" by formulating these as a constraint optimization problem with the objective to maximize the overall system utility for a given provisioning window. The output of the optimization is not just a single solution but rather the top-K options.

Moreover, in item 630, the method selects a plurality of potential migration speeds at which the potential data items can be moved. This can include, in item 632, selecting a migration speed below a threshold speed, wherein the threshold speed defines a maximum system utility loss permitted. As described above, with the assistance of the performance model, the performance impact of the migration process on the whole system can be predicted. With a goal of minimizing system utility loss in mind, the migration speed decision should be evaluated according to the utility impact of the migration process. The migration. The foreground task migration and/or the background task migration is selected based on the balancing. Following this, in item 670, the method calculates potential system utility gain associated with different migration combinations of the potential data items, the potential migration destinations, the potential migration speeds, and the potential migration times.

Next, in item 680, a risk of system utility loss associated with each of the migration combinations is evaluated. This could involve, in item 682, calculating a probability of system utility loss as a result of incorrectly predicting the future workload request rates and/or the future system performance. For example, the demand for $W_1$ was expected to be 10K IOPS after 1 month, but it turns out to be 5K (the inverse of this problem is handled reactively). A probability of system utility loss as a result of selecting a migration combination that results in system utility loss could also be calculated. For example, moving data at 11 am in a weekday morning (during high system utilization) has a higher risk compared to moving the data at 9 pm on a weekend (during low system utilization). Subsequently, in item 690, a migration combination is selected from the migration combinations that has a highest net system utility gain based on the potential system utility gain and the risk of system utility loss.

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments of the invention is depicted in FIG. 7. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Accordingly, the embodiments of the invention provide a method and system for large scale data migration in systems that "never sleep" with the ability to optimize for current as well as look-ahead states. The methods and systems herein decide on invocation time with minimal impact on system performance and prioritize the migration process as foreground or background tasks based on utility impact. Furthermore, risk evaluations of different migration plans are performed, as well as performance modeling and time-series workload forecasts.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A method of planning data migration for maximizing utility of a storage infrastructure that is running and actively serving at least one application, said method comprising:

selecting a plurality of potential data items for migration;

selecting a plurality of potential migration destinations to which said potential data items can be moved;

selecting a plurality of potential migration speeds at which said potential data items can be moved;

selecting a plurality of potential migration times at which said potential data items can be moved to said potential data migration destinations;

calculating potential system utility gain associated with different migration combinations of said potential data items, said potential migration destinations, said potential migration speeds, and said potential migration times, wherein at least one of said selecting of said plurality of said potential data items for migration, said selecting of said plurality of potential migration destinations, said selecting of said plurality of potential migration speeds, and said selecting of said plurality of potential migration times comprises predicting at least one of future workload request rates and future system performance based on at least one of historic workload demands, current workload demands, simulation models, device-specific information, and expert input;

evaluating a risk of system utility loss associated with each of said migration combinations; and selecting a migration combination from said migration combinations that has a highest net system utility gain based on said potential system utility gain and said risk of system utility loss, wherein said evaluating of said risk comprises at least one of:

calculating a probability of system utility loss as a result of incorrectly predicting at least one of said future workload request rates and said future system performance; and calculating a probability of system utility loss as a result of selecting a migration combination that results in system utility loss, wherein at least one of said selecting of said plurality of said potential data items for migration, said selecting of said plurality of potential migration destinations, said selecting of said plurality of potential migration speeds, and said selecting of said plurality of potential migration times comprises:

balancing an effect on said potential system utility gain of foreground task migration and an effect on said potential system utility gain of background task migration, and selecting at least one of said foreground task migration and said background task migration based on said balancing, wherein said selecting of said plurality of potential migration speeds comprises selecting a migration speed below a threshold speed, wherein said threshold speed defines a maximum system utility loss permitted.

* * * * *